United States Patent
Dou

(10) Patent No.: US 11,614,639 B2
(45) Date of Patent: Mar. 28, 2023

(54) MULTI-RING MULTI-FOCAL-LENGTH SINGLE-RING INNER WAVY LENS

(71) Applicant: JIANGSU RARE OPTICS CO., LTD, Zhenjiang (CN)

(72) Inventor: Jiantai Dou, Zhenjiang (CN)

(73) Assignee: JIANGSU RARE OPTICS CO., LTD, Zhenjiang (CN)

( * ) Notice: Subject to any disclaimer, the term of this patent is extended or adjusted under 35 U.S.C. 154(b) by 0 days.

(21) Appl. No.: 17/960,107

(22) Filed: Oct. 4, 2022

(65) Prior Publication Data

US 2023/0050507 A1    Feb. 16, 2023

(30) Foreign Application Priority Data

Aug. 11, 2021    (CN) .......................... 202110916748.6

(51) Int. Cl.
*G02C 7/04*    (2006.01)

(52) U.S. Cl.
CPC ......... *G02C 7/044* (2013.01); *G02C 2202/24* (2013.01)

(58) Field of Classification Search
CPC .......... G02C 7/044; G02C 7/041; G02C 7/04; G02C 7/066; G02C 2202/24
USPC .................................................. 351/159.42
See application file for complete search history.

(56) References Cited

U.S. PATENT DOCUMENTS

| 5,166,712 A | 11/1992 | Portney | |
|---|---|---|---|
| 9,709,820 B2 * | 7/2017 | Fujii | G02C 7/02 |
| 2005/0068494 A1 * | 3/2005 | Griffin | G02C 7/044 |
| | | | 351/159.41 |
| 2008/0002149 A1 * | 1/2008 | Fritsch | G02C 7/049 |
| | | | 351/159.02 |

FOREIGN PATENT DOCUMENTS

| BR | 9304981 A | * | 6/1994 | ............ G02C 7/042 |
|---|---|---|---|---|
| CN | 1756982 A | * | 4/2006 | ............ G02C 7/04 |
| CN | 104094164 A | | 10/2014 | |
| CN | 111103701 A | | 5/2020 | |
| CN | 111399250 A | | 7/2020 | |
| WO | 2021047488 A1 | | 3/2021 | |

* cited by examiner

*Primary Examiner* — James R Greece

(57) ABSTRACT

Disclosed is a multi-ring multi-focal-length single-ring inner wavy lens. The lens comprises a main lens area and a concentric circular ring area. The concentric circular ring area comprises a plurality of circular rings, the plurality of circular rings are concentrically distributed with the center of the lens as the center, the width of an annulus between every two adjacent circular rings gradually increases from inside to outside, and the circular rings each are of a wavy structure. Each wavy structure comprises peaks and valleys, the diopter of a position where each peak is located is greater than that of the main lens area, and the diopter of a position where each valley is located is smaller than that of the main lens area. The lens disclosed by the present disclosure can provide a plurality of focus regions to enhance the fitness of human eyes.

8 Claims, 3 Drawing Sheets

MULTI-RING MULTI-FOCAL-LENGTH SINGLE-RING INNER WAVY LENS

CROSS-REFERENCE TO RELATED APPLICATION

This patent application claims the benefit and priority of Chinese Patent Application No. 202110916748.6, filed with the China National Intellectual Property Administration on Aug. 11, 2021, the disclosure of which is incorporated by reference herein in its entirety as part of the present application.

TECHNICAL FIELD

The present disclosure relates to a multi-focal-length lens, and in particular relates to a multi-ring multi-focal-length single-ring inner wavy lens.

BACKGROUND

Due to excessive use of eyes for a long time or at close range, the ciliary body of the eyes is overburdened and strained for a long time, and over time, the muscles of the eyes are in spasm, this causes blurred vision in the distance and leads to myopia. After myopia, it is common to wear myopic glasses to correct refractive errors of the users. However, when wearing conventional lenses, the increase of myopia and progression of refractive errors still cannot be avoided due to long-time and close-range use of the eyes. To inhibit the progression of refractive errors, functional lenses capable of inhibiting the progression of refractive errors of myopia and hyperopia of human eyes have appeared on the market. Such lenses are used to inhibit the progression of refractive errors by providing multi-focal-length area on the conventional lens and providing the diopter different from that of the main lens. However, most of such functional lenses employ Fresnel lenses and miniature island array structures. During the use of the concentric Fresnel lenses, when the line of sight passes through a position away from the center of the lens, the image formed by the first diopter zone and the image formed by the second diopter are observed in different directions, resulting in double vision. During the use of the lens with the miniature island array structure, the overall processing uniformity of the miniature island structure is difficult to guarantee, and the structure is easy to be damaged, affecting the long-term use effect.

SUMMARY

Objective of the present disclosure: An objective of the present disclosure is to provide a multi-ring multi-focal-length single-ring inner wavy lens which has a plurality of focal lengths and is capable of inhibiting the progression of refractive errors.

The technical solution is as follows: a multi-ring multi-focal-length single-ring inner wavy lens comprises a main lens area and a concentric circular ring area. The concentric circular ring area comprises a plurality of circular rings, and the plurality of circular rings are concentrically distributed with the center of the lens as the center. The circular rings each are of a wavy structure. The wavy structure comprises peaks and valleys, where the diopter of a position where each peak is located is greater than that of the main lens area, the diopter of a position where each valley is located is smaller than that of the main lens area.

The wavy structure adopts a spherical surface, an aspheric surface, or a free-form surface.

The diopter of the wavy structure has a variation range of −2.5 D to 2.5 D compared to the diopter of the main lens area.

The peaks and the valleys in the same radial direction but different annuluses of the adjacent annuluses of the wavy structure are all distributed in a staggered mode.

The adjacent annuluses of the wavy structure have a deviation of −0.5 D to 0.5 D in the diopter.

The joint between adjacent rings of the wavy structure is in a smooth shape or a wavy shape.

The smooth shape has a diopter deviation from the main lens area in the range of −0.5 D to 0.5 D.

The wavy shape has a diopter deviation from the main lens area in the range of −1.5 D to 1.5 D.

The concentric circular ring area is distributed in a circular ring region with a radius ranging from 2 mm to 15 mm with the center of the lens as the center, the number of rings of the concentric circular ring area is 6 to 20, the width of the annulus between adjacent circular rings gradually increases from inside to outside, and the width of each annulus is in the range of 0.2 mm to 2 mm.

The main lens area is a main myopia correction lens area.

The present disclosure has the beneficial effects that: the lens may provide a plurality of focus regions to enhance the fitness of human eyes. As the focal lengths in different rings are different, the distances of overall imaging on the retina are different, and thus the effect of inhibiting the progression of refractive errors can be achieved. Meanwhile, the number of rings, the width of the annulus, parameters of the wavy, the connection mode and surface type parameters of adjacent rings, the peak-valley dislocation degree of the adjacent rings and the like are all optimized parameters, and the plurality of optimized parameters are more favorable for optimizing the aberration of the whole lens, such that a wearer can recognize an object better and more clearly, and even if the eyes move, the object can still be seen clearly by observing from different angles without discomfort.

DETAILED DESCRIPTION OF THE EMBODIMENTS

The present disclosure is further described below with reference to the accompanying drawings.

Figure 1:
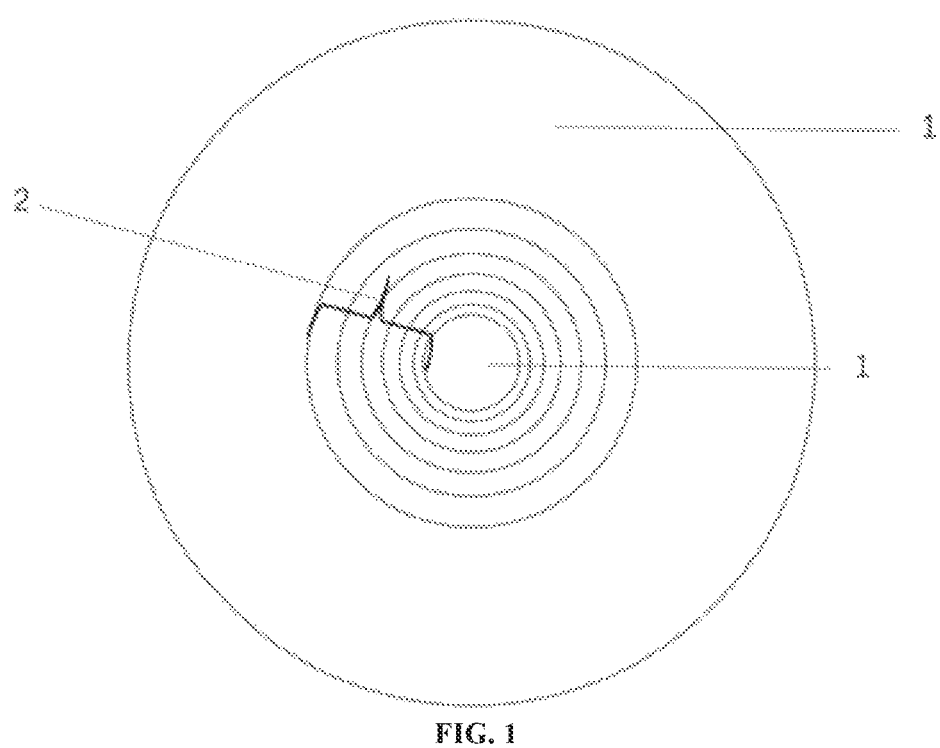
FIG. 1 is a top view the present disclosure.

As shown in FIG. 1, a multi-ring multi-focal-length single-ring inner wavy lens comprises a main myopia correction lens area 1 and a concentric circular ring area 2. The back surface 101 of the main myopia correction lens area 1 provides a carrier and co-constitutes the overall diopter with the structure of the present disclosure. The concentric circular ring area 2 comprises a plurality of circular rings, each circular ring employs a wavy structure 3, and the regions except for the concentric circular ring area 2 is the main myopia correction lens area 1. The concentric circular ring area is distributed in a circular ring area with a radius range of 2 mm to 15 mm with the center of the lens as the center, and the number of rings in the concentric circular ring area 2 is 6 to 20. The radius of the circular ring in the concentric circular ring area 2 satisfies that: $2 \text{ mm} \leq R1 \leq R2$, $Rn \leq Rn\pm1 \leq 15$ mm, the width of the annulus is that $W1=R2-R1$, $W2=R3-R2, \ldots, Wn=Rn+1-Rn$, the width satisfies that the condition that: $2 \text{ mm} \leq W1 \leq W2 \ldots \leq Wn \leq 2$ mm, and the widths of the adjacent annuluses gradually increase from the center to the outside.

Figure 2:
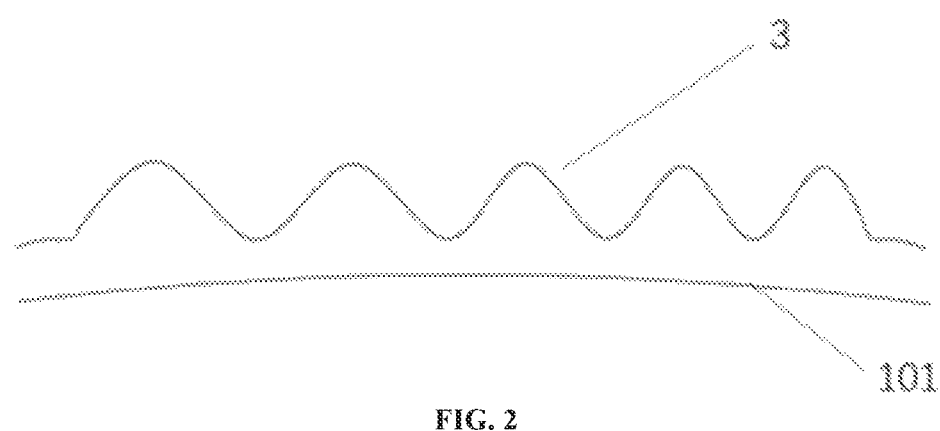
FIG. 2 is a schematic diagram of the cross section of a wavy structure in accordance with the present disclosure.

As shown in FIG. 2, the wavy structure 3 employs a spherical surface, an aspheric surface, or a free-form surface. Each wavy structure 3 comprises peak positions and valley positions, the diopter of the position where each peak is located is greater than that of the main myopia correction lens area 1, and the diopter of the position where each valley is smaller than that of the main myopia correction lens area 1. The diopter of the wavy structure 3 has a variation range of −2.5 D to 2.5 D compared to the diopter of the main myopia correction lens area 1.

Figure 3:
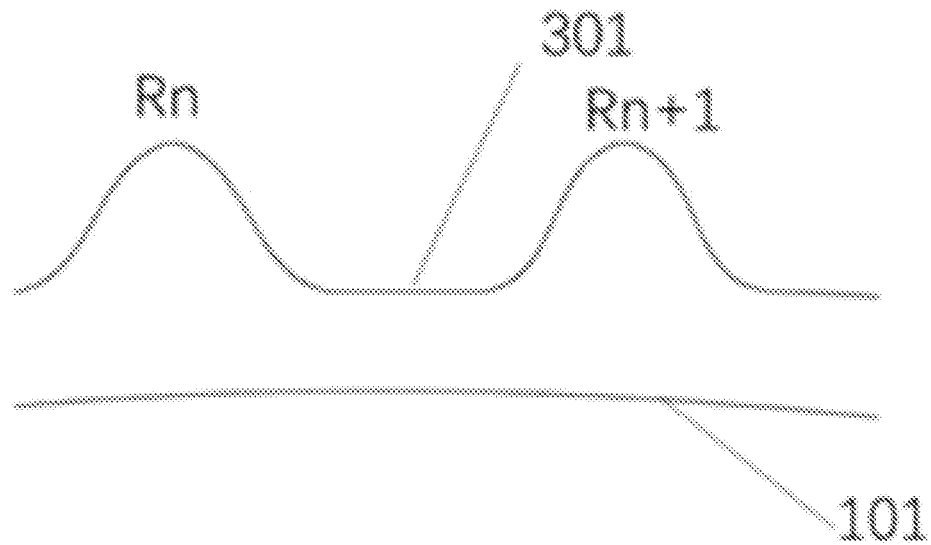
FIG. 3 is a schematic diagram of the cross section of the joint of wavy structures of adjacent rings in accordance with the present disclosure.
Figure 4:
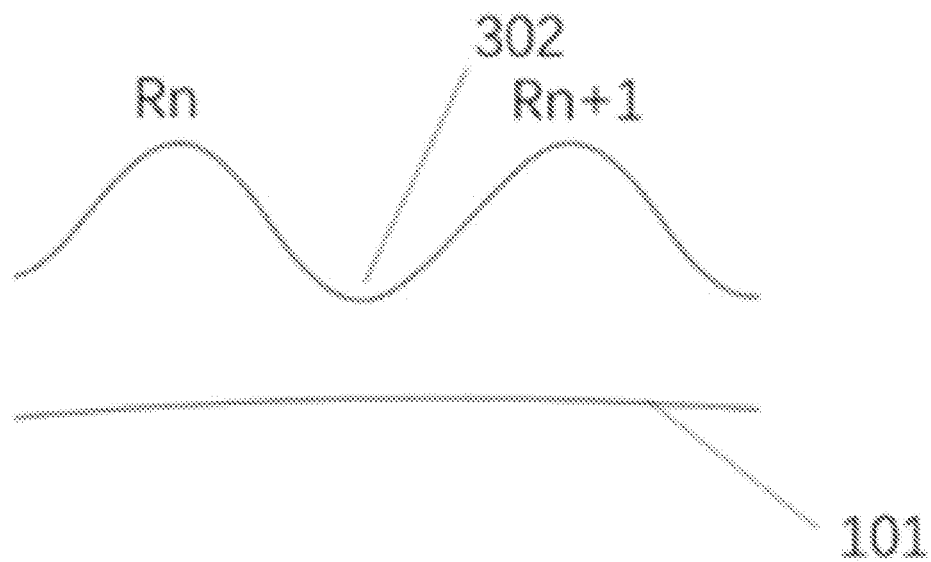
FIG. 4 is a schematic diagram of the cross section of the joint of wavy structures of adjacent rings in accordance with the present disclosure.

As shown in FIG. 3 and FIG. 4, wherein the joint between the adjacent rings of the wavy structure is in a smooth shape 301 or a wavy shape 302. The smooth shape 301 has a diopter deviation from the main myopia correction lens area 1 in the range of −0.5 D to 0.5 D. The wavy shape 302 has a diopter deviation from the main myopia correction lens area 1 in the range of −1.5 D to 1.5 D.

Figure 5:
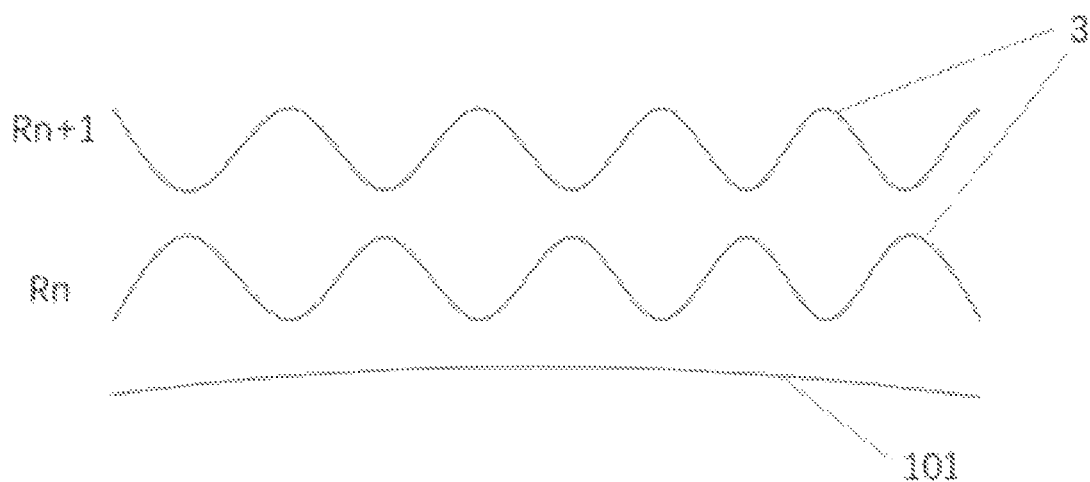
FIG. 5 is a schematic diagram of radial cross sections of adjacent rings in accordance with the present disclosure.

As shown in FIG. 5, the peaks and the valleys in the same radial direction but different annuluses of the adjacent annuluses of the wavy structure 3 are all distributed in a staggered mode, and there is a deviation of −0.5 D to 0.5 D in the diopter of adjacent annuluses.

Embodiment 1

In accordance with this embodiment, the concentric circular ring area is distributed in a circular ring area with a radius range of 3 mm to 10 mm with the center of the lens as the center, the number of rings in the concentric circular ring area is 12, and the wavy structure is in a shape of spherical surface. The peak diopter of the wavy structure is 1.5 D greater than the diopter of the main myopia correction lens area, and the valley diopter of the wavey structure is 1.5 D smaller than the diopter of the main myopia correction lens area. The joint between the adjacent rings of the wavy structure is a smooth shape. The smooth shape has a diopter deviation from the main myopia correction lens area in the range of −0.5 D. The width of the annulus of the wavy structure is between 0.4 mm to 0.8 mm. The peaks and the valleys in the same radial direction but different annuluses of the adjacent annuluses of the wavy structure are all distributed in a staggered mode, and the diopter of the annulus with the center outwards has a deviation of +0.5 D compared to the diopter of the adjacent inner ring.

Embodiment 2

In accordance with this embodiment, the concentric circular ring area is distributed in a circular ring area with a radius range of 2 mm to 12 mm with the center of the lens as the center, the number of rings in the concentric circular ring area is 20, and the wavy structure is in a shape of aspherical surface. The peak diopter of the wavy structure is 1 D greater than the diopter of the main myopia correction lens area, and the valley diopter of the wavey structure is 1 D smaller than the diopter of the main myopia correction lens area. The joint between the adjacent rings of the wavy structure is a wavy shape. The wavy shape has a diopter deviation from the main myopia correction lens area in the range of −1 D to 1 D. The width of the annulus of the wavy structure is between 0.2 mm to 2 mm. The peaks and the valleys in the same radial direction but different annuluses of the adjacent annuluses of the wavy structure are all distributed in a staggered mode, and the diopter of the annulus with the center outwards has a deviation of −0.5 D to 0.5 D compared to the diopter of the adjacent inner ring.

Embodiment 3

In accordance with this embodiment, the concentric circular ring area is distributed in a circular ring area with a radius range of 2 mm to 10 mm with the center of the lens as the center, the number of rings in the concentric circular ring area is 16, and the wavy structure is in a shape of free-form surface. The peak diopter of the wavy structure is 1.5 D greater than the diopter of the main myopia correction lens area, and the valley diopter of the wavey structure is 1.5 D smaller than the diopter of the main myopia correction lens area. The joint between the adjacent rings of the wavy structure is a wavy shape. The wavy shape has a diopter deviation from the main myopia correction lens area in the range of −1.5 D to 1.5 D. The width of the annulus of the wavy structure is between 0.2 mm to 1.6 mm. The peaks and the valleys in the same radial direction but different annuluses of the adjacent annuluses of the wavy structure are all distributed in a staggered mode, and the diopter of the annulus with the center outwards has a deviation of −0.5 D to 0.5 D compared to the diopter of the adjacent inner ring.

The lens may provide a plurality of focus regions to enhance the fitness of human eyes. As the focal lengths in different rings are different, the distances of overall imaging on the retina are different, and the effect of inhibiting the progression of refractive errors can be achieved. Meanwhile, the number of rings, the width of the annulus, parameters of the wavy, the connection mode and surface type parameters of adjacent rings, the peak-valley dislocation degree of the adjacent rings and the like are all optimized parameters, and the plurality of optimized parameters are more favorable for optimizing the aberration of the whole lens, such that a wearer can recognize an object better and more clearly, and even if the eyes move, the object can still be seen clearly by observing from different angles without discomfort.

What is claimed is:
1. A multi-ring multi-focal-length single-ring inner wavy lens, comprising a main lens area and a concentric circular ring area (2), wherein the concentric circular ring area is arranged on the main lens area, the concentric circular ring area (2) comprises a plurality of circular rings, and the plurality of circular rings are concentrically distributed with the center of the lens as the center; the circular rings each are of a wavy structure (3); the wavy structure (3) comprises peaks and valleys, the diopter of a position where each peak is located is greater than that of the main lens area, the diopter of a position where each valley is located is smaller than that of the main lens area; and the diopter of the wavy structure (3) has a variation range of −2.5 D to 2.5 D compared to the diopter of the main lens area, and the adjacent annuluses of the wavy structure (3) have a deviation of −0.5 D to 0.5 D in the diopter.

2. The multi-ring multi-focal-length single-ring inner wavy lens according to claim 1, wherein the wavy structure (3) adopts a spherical surface, an aspheric surface, or a free-form surface.

3. The multi-ring multi-focal-length single-ring inner wavy lens according to claim 1, wherein the peaks and the valleys in the same radial direction but different annuluses of the adjacent annuluses of the wavy structure (3) are all distributed in a staggered mode.

4. The multi-ring multi-focal-length single-ring inner wavy lens according to claim 1, wherein the joint between adjacent rings of the wavy structure (3) is in a smooth shape (301) or a wavy shape (302).

5. The multi-ring multi-focal-length single-ring inner wavy lens according to claim 4, wherein the smooth shape (301) has a diopter deviation from the main lens area in the range of −0.5 D to 0.5 D.

6. The multi-ring multi-focal-length single-ring inner wavy lens according to claim 4, wherein the wavy shape (302) has a diopter deviation from the main lens area in the range of −1.5 D to 1.5 D.

7. The multi-ring multi-focal-length single-ring inner wavy lens according to claim 1, wherein the concentric circular ring area (2) is distributed in a circular ring region with a radius ranging from 2 mm to 15 mm with the center of the lens as the center, the number of rings of the concentric circular ring area (2) is 6 to 20, the width of the annulus between adjacent circular rings gradually increases from inside to outside, and the width of the annulus is in the range of 0.2 mm to 2 mm.

8. The multi-ring multi-focal-length single-ring inner wavy lens according to claim 1, wherein the main lens area is a main myopia correction lens area (1).

* * * * *